United States Patent
Klein et al.

(10) Patent No.: US 7,602,898 B2
(45) Date of Patent: Oct. 13, 2009

(54) SYSTEM AND METHOD FOR PROVIDING COMPUTER ASSISTED USER SUPPORT

(75) Inventors: Adam Lee Klein, Cedar Park, TX (US); Charles Scott, Austin, TX (US); Marc Andrew Sullivan, Austin, TX (US); Wesley McAfee, Cedar Park, TX (US); Donn Wilburn, Jr., Seagoville, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1014 days.

(21) Appl. No.: 10/920,720

(22) Filed: Aug. 18, 2004

(65) Prior Publication Data

US 2006/0039547 A1    Feb. 23, 2006

(51) Int. Cl.
*H04M 3/00*  (2006.01)
*H04M 5/00*  (2006.01)

(52) U.S. Cl. .................... 379/265.01; 379/220.01; 709/224

(58) Field of Classification Search ............ 379/220.01, 379/265.01; 709/224
See application file for complete search history.

(56) References Cited

U.S. PATENT DOCUMENTS

| | | |
|---|---|---|
| 4,953,204 A | 8/1990 | Cuschleg, Jr. et al. |
| 4,967,405 A | 10/1990 | Upp et al. |
| 5,335,269 A | 8/1994 | Steinlicht |
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Liao et al. |
| 5,652,789 A | 7/1997 | Miner et al. |
| 5,754,639 A | 5/1998 | Flockhart et al. |
| 5,754,978 A | 5/1998 | Perez-Mendez et al. |
| 5,923,745 A | 7/1999 | Hurd |
| 5,940,476 A | 8/1999 | Morganstein et al. |
| 5,946,388 A | 8/1999 | Walker et al. |
| 5,953,704 A | 9/1999 | McIlroy et al. |
| 5,999,965 A | 12/1999 | Kelly |
| 6,002,689 A | 12/1999 | Christie et al. |

(Continued)

FOREIGN PATENT DOCUMENTS

EP    0 424 015 A2    4/1991

(Continued)

OTHER PUBLICATIONS

U.S. Appl. No. 10/898,722, filed Jul. 23, 2004.

(Continued)

*Primary Examiner*—Quynh H Nguyen
(74) *Attorney, Agent, or Firm*—Toler Law Group

(57) ABSTRACT

The disclosure is directed to a customer support call system including an interactive voice response system configured to receive a customer support call and configured to determine a caller identification. The interactive voice response system is configured to determine whether the customer support call is associated with a computer system having an installed self-support tool. The customer support call system further includes a call center management system responsive to the interactive voice response system. The call center management system is configured to direct the customer support call in response to determining whether the customer support call is associated with the computer system having the installed self-support tool.

17 Claims, 6 Drawing Sheets

U.S. PATENT DOCUMENTS

| | | | |
|---|---|---|---|
| 6,002,760 A | 12/1999 | Gisby | |
| 6,003,011 A | 12/1999 | Sarin et al. | |
| 6,049,594 A | 4/2000 | Furman et al. | |
| 6,118,866 A | 9/2000 | Shtivelmann | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,496,567 B1 * | 12/2002 | Bjornberg et al. | 379/88.02 |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,113 B1 | 4/2003 | Dhir et al. | |
| 6,570,967 B2 | 5/2003 | Katz | |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,895,532 B2 * | 5/2005 | Raynham | 714/46 |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,963,983 B2 | 11/2005 | Munson et al. | |
| 7,006,605 B1 | 2/2006 | Morganstein et al. | |
| 7,379,886 B1 * | 5/2008 | Zaring et al. | 705/5 |
| 7,430,554 B1 * | 9/2008 | Heisinger, Jr. | 707/10 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0118159 A1 | 6/2003 | Shen et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2003/0228007 A1 | 12/2003 | Kurosaki | |
| 2003/0235287 A1 | 12/2003 | Margolis | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083206 A1 * | 4/2004 | Wu et al. | 707/3 |
| 2004/0083479 A1 | 4/2004 | Bondarenko et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0120473 A1 | 6/2004 | Birch et al. | |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |

| | | | |
|---|---|---|---|
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2005/0008141 A1 | 1/2005 | Kortum et al. | |
| 2005/0015744 A1 | 1/2005 | Bushey et al. | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0055216 A1 | 3/2005 | Bushey et al. | |
| 2005/0058264 A1 | 3/2005 | Joseph et al. | |
| 2005/0075894 A1 | 4/2005 | Bushey et al. | |
| 2005/0078805 A1 | 4/2005 | Mills et al. | |
| 2005/0080630 A1 | 4/2005 | Mills et al. | |
| 2005/0080667 A1 | 4/2005 | Knott et al. | |
| 2005/0086630 A1* | 4/2005 | Chefalas et al. | 717/100 |
| 2005/0131892 A1 | 6/2005 | Knott et al. | |
| 2005/0132262 A1 | 6/2005 | Bushey et al. | |
| 2005/0135595 A1 | 6/2005 | Bushey et al. | |
| 2005/0141692 A1 | 6/2005 | Scherer et al. | |
| 2005/0169441 A1 | 8/2005 | Yacoub et al. | |
| 2005/0169453 A1 | 8/2005 | Knott et al. | |
| 2005/0201547 A1 | 9/2005 | Burg et al. | |
| 2005/0240411 A1 | 10/2005 | Yacoub | |
| 2006/0002540 A1* | 1/2006 | Kreiner et al. | 379/265.02 |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/975,023, filed Oct. 27, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

* cited by examiner

```
┌─────────────────────────────────────────────────────────┐
│ COLLECTING DATA FROM A SELF-SUPPORT TOOL, THE DATA      │
│ INCLUDING A CUSTOMER IDENTIFIER, A REPORTED TROUBLE     │
│ ISSUE, AND RESOLUTION ACTION FOR THE REPORTED TROUBLE   │
│ ISSUE                                                    │
│                          502                             │
└─────────────────────────────────────────────────────────┘
                             │
                             ▼
┌─────────────────────────────────────────────────────────┐
│ COMPARING THE DATA FROM THE SELF-SUPPORT TOOL TO A CALL │
│ CENTER DATA LOG TO DETERMINE WHETHER THE CUSTOMER       │
│ CALLED THE CALL CENTER FOR SUPPORT WITH RESPECT TO THE  │
│ REPORTED TROUBLE ISSUE OR WHETHER THE CALL WAS          │
│ DEFLECTED BY USE OF THE SELF-SUPPORT TOOL               │
│                          504                             │
└─────────────────────────────────────────────────────────┘
                             │
                             ▼
┌─────────────────────────────────────────────────────────┐
│ RECORDING MEASUREMENT DATA WITH RESPECT TO A RESULT OF  │
│ COMPARING THE CALL CENTER DATA LOG AND THE DATA FROM    │
│ THE SELF-SUPPORT TOOL                                   │
│                          506                             │
└─────────────────────────────────────────────────────────┘
                             │
                             ▼
┌─────────────────────────────────────────────────────────┐
│ DETERMINING A FIRST COST SAVINGS ESTIMATE BY MULTIPLYING│
│ THE AVERAGE COST OF CALL CENTER SUPPORT FOR A FIRST TYPE│
│ OF REPORTED TROUBLE ISSUE WITH THE NUMBER OF RECORDED   │
│ DEFLECTED CALLS HAVING THE FIRST TYPE OF THE REPORTED   │
│ TROUBLE ISSUE            508                             │
└─────────────────────────────────────────────────────────┘
                             │
                             ▼
┌─────────────────────────────────────────────────────────┐
│ DETERMINING A SECOND COST SAVINGS ESTIMATE BY MULTIPLYING│
│ THE AVERAGE COST OF CALL CENTER SUPPORT FOR A SECOND    │
│ TYPE OF REPORTED TROUBLE ISSUE WITH THE NUMBER OF       │
│ RECORDED DEFLECTED CALLS HAVING THE SECOND TYPE OF THE  │
│ REPORTED TROUBLE ISSUE                                  │
│                          510                             │
└─────────────────────────────────────────────────────────┘
                             │
                             ▼
┌─────────────────────────────────────────────────────────┐
│ DETERMINING THE COST SAVINGS ESTIMATE BY ADDING FIRST   │
│ COST SAVINGS ESTIMATE AND SECOND COST SAVINGS ESTIMATE  │
│                          512                             │
└─────────────────────────────────────────────────────────┘
                             │
                             ▼
┌─────────────────────────────────────────────────────────┐
│ REPORT TOTAL COST SAVINGS ESTIMATE                      │
│                          514                             │
└─────────────────────────────────────────────────────────┘
```

FIG. 5

SYSTEM AND METHOD FOR PROVIDING COMPUTER ASSISTED USER SUPPORT

FIELD OF THE DISCLOSURE

This disclosure, in general relates to systems and methods for providing computer assisted user support.

BACKGROUND

Traditionally, customer support for technical issues has been performed using technical support call centers. When a customer has a technical issue or trouble with a technology related product, such as high-speed Internet access or a software product, the customer calls the call center to discuss the trouble with a call center agent. However, operation of technical support call centers is expensive.

Technical support call center agents are generally experienced and competent in technology related fields. As such, technical support agents demand higher wages than the average call center agent. In addition, technical support agents undergo expensive training relating to the technology products they support, increasing agent costs.

To reduce costs associated with technical support call centers, some companies have attempted to move technical support call centers to countries with lower labor costs. However, foreign call centers incur increased expenses relating to communication traffic. In addition, companies typically find a shortage in competent and trained agents in the foreign location.

For both regional and foreign call centers, increased usage by customers leads to further increased costs. High call volume leads to high labor costs for regional call centers and high communications traffic and logistics problems for foreign call centers.

For some products, such as high-speed Internet connections and software products, companies have developed automated self-support tools in an effort to reduce call volume. However, these support tools typically do not provide metrics or measurements as to their effectiveness. Therefore, there is a need for improved systems and methods for providing automated self-support tools and for measuring the effectiveness of using such tools.

BRIEF DESCRIPTION OF THE DRAWINGS

FIGS. 3, 4, 5 and 6 are flow diagrams illustrating exemplary methods of operation of customer support systems such as those illustrated in FIGS. 1 and 2.

DESCRIPTION OF THE DRAWING(S)

In a particular embodiment, the disclosure is directed to a customer support call system including an interactive voice response system configured to receive a customer support call and configured to determine a caller identification. The interactive voice response system is configured to determine whether the customer support call is associated with a computer system having an installed self-support tool. The customer support call system further includes a call center management system responsive to the interactive voice response system. The call center management system is configured to direct the customer support call in response to determining whether the customer support call is associated with the computer system having the installed self-support tool.

In another exemplary embodiment, the disclosure is directed to a method of providing computer assisted user support to a computer user. The method includes receiving a customer support call and a caller identification associated with the customer support call, determining whether the customer support call is associated with a computer system having an installed self-support tool based on the caller identification, and managing the customer support call in response to determining whether the customer support call is associated with the computer system having the installed self-support tool.

In a further exemplary embodiment, the disclosure is directed to a computer implement system having computer readable memory including computer implemented software instructions operable to perform the method described above.

Figure 1:
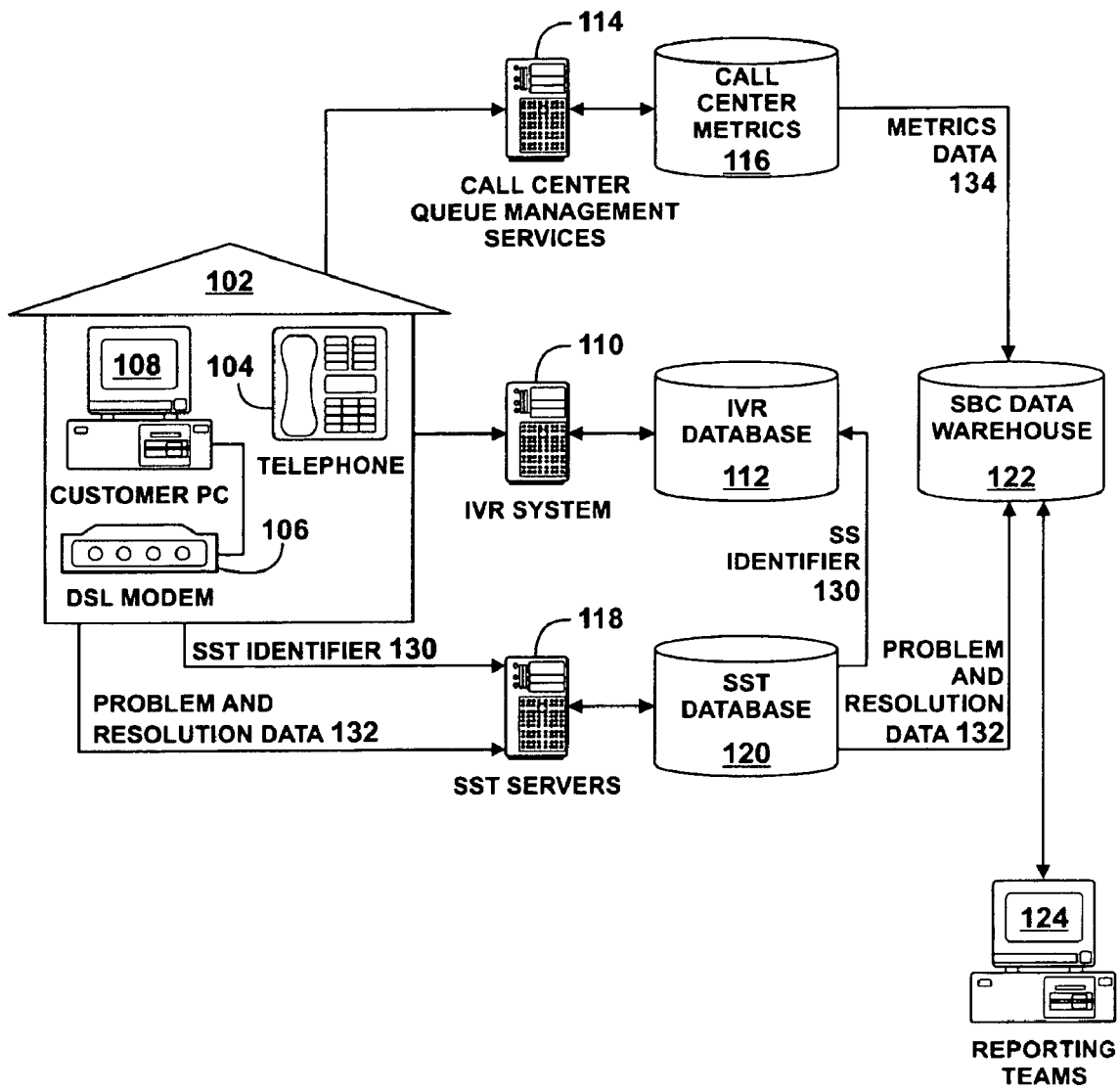
FIGS. 1 and 2 are block diagrams illustrating exemplary embodiments of customer support systems.

An illustrative system is depicted in FIG. 1. A customer located at a customer location 102 may have on premise equipment, such as a telephone 104 and a computer 108 coupled to a modem 106. The customer may, for example, install a computer software self-support and diagnostics tool on the computer 108. Once installed, the self-support and diagnostics tool communicates an SST identifier 130, such as a DSL telephone number of the customer, via a broadband transport, such as through the modem 106, such as a DSL modem, to a self-support tool (SST) server 118. The SST server 118 stores the customer's DSL telephone number in a SST database 120. Broadband transports may include digital subscriber lines (DSL), fiber optic data lines, cable data networks, long range wireless data networks and satellite communications systems. In alternative embodiments, the SST identifier 130 can be a unique customer identifier, such as an account number, member identifier or telephone number.

The SST identifier stored in the SST database 120 is transferred to an interactive voice response (IVR) system 110 and stored in an IVR database 112. For example, DSL telephone numbers may be transferred as received, periodically (i.e. hourly or nightly), or during off-peak times (i.e. at night).

When the customer experiences a problem, the customer may use the self-support tool (SST) installed on the computer 108. For example, the computer software SST may launch automatically in response to detecting a problem. Alternatively, the computer software SST may be initiated by a user of the computer 108. If the problem is resolved by the computer software SST, information about the problem and resolution of the problem 132 is sent to the SST server 118 and stored on the SST database 120. Information about failure to solve a problem 132 may also be transferred and stored on the SST database 120. Data associated with resolution of customer problems, such as SST problem resolution metrics, are reported to a data warehouse 122. When a problem has been resolved by the SST and the customer does not call a call center, the call has been deflected, reducing the number of calls the call center receives.

If a customer calls a call center for support, the customer may first interact with an interactive voice response (IVR) system 110. The IVR system 110 receives customer identification information, such as DSL telephone number information, and compares the information to SST identifiers, such as the DSL telephone numbers previously stored in the IVR database 112. The IVR directs the call based on whether the customer has an installed and operational SST. For example, if the IVR determines, based on finding the customer's DSL telephone number in a list of stored DSL telephone numbers, that the customer has an installed and operational SST, the system may direct the call to an SST supporting agent or may direct the troubleshooting flow to be followed by the agent. For example, the call may be sent to a call center queue management server 114 with an indication that an SST is installed on the customer's computer.

Based on the customer's identification and response to menu options and queries, the customer may be transferred to a call center queue management server 114 to await interaction with a call center agent. Information associated with the customer's call, such as the DSL telephone number, reason for the call, and resolution data, may be stored in a call center metrics database 116.

The call center metrics database 116 transfers data 134, such as the DSL telephone numbers, to the data warehouse 122 for storage. Reporting teams may access the data warehouse 122 via a reporting team interface 124. The data warehouse 122, which includes data received from the SST database 120 and data received from the call center metrics database 116, may be used to analyze and report effectiveness of the computer software SST. For example, the reporting team interface 124 may determine efficiency of the SST, a return on investment (ROI) based on a number of measured deflected calls, and future problem resolutions that may be implemented in subsequent versions of the computer software SST. In one exemplary embodiment, the reporting team interface 124 may compare DSL telephone numbers of customers calling into the call center with the DSL telephone numbers of customers running the computer software SST to determine an efficiency of the SST or the ROI of the SST.

Figure 2:
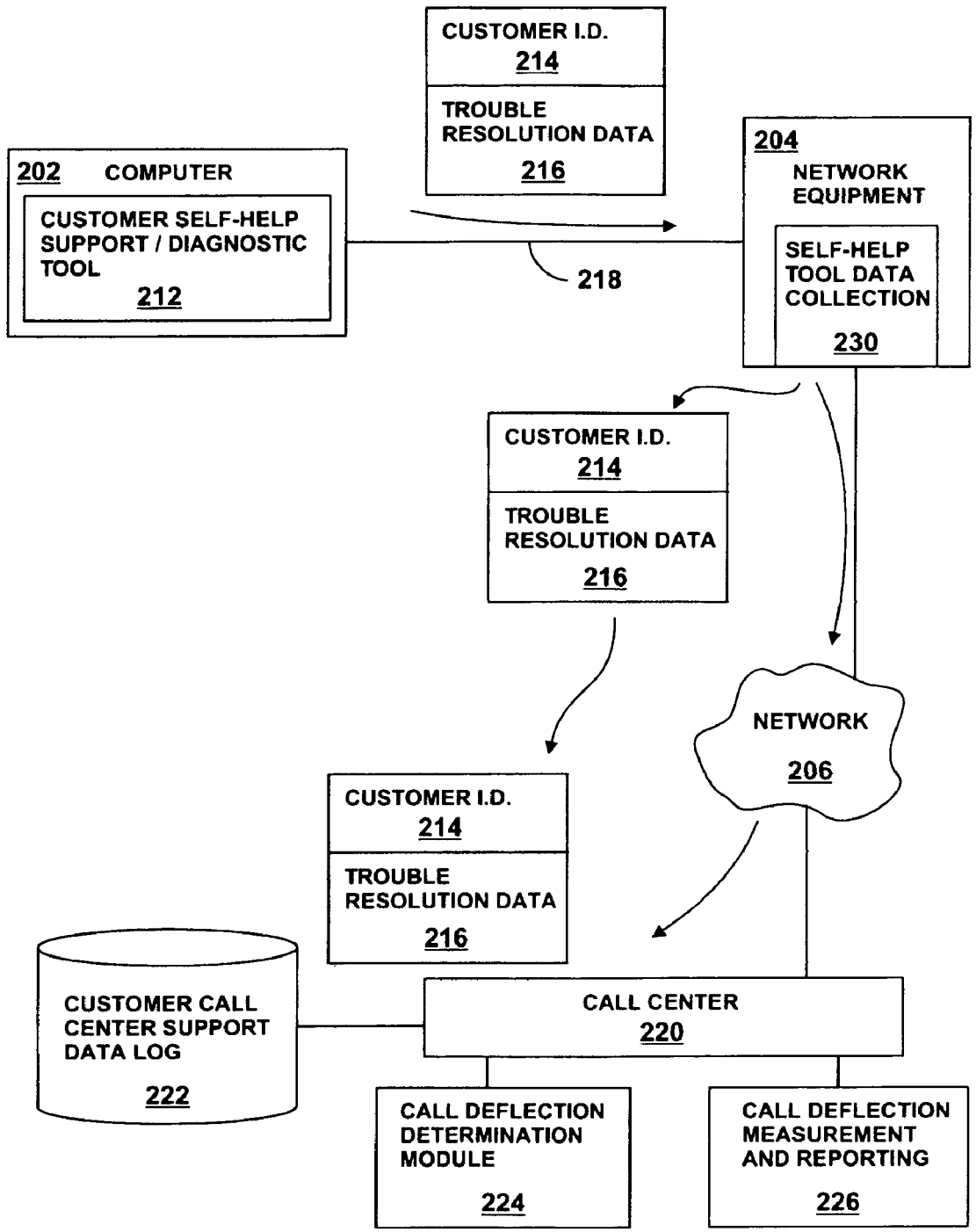

Referring to FIG. 2, an illustrative system is shown. The system includes a representative end user computer 202 coupled via a data connection 218 to network equipment 204. The system further includes a call center 220 coupled to the network equipment 204 via an intermediate computer network 206. The call center 220 is coupled to a customer call center support data log 222, a call deflection determination module 224, and a call deflection measurement and reporting module 226. The end computer 202 includes a customer self-help support and diagnostic software tool 212.

During operation, a user of the computer 202 executes the customer self-help support and diagnostic software tool 212 and generates trouble resolution data 216. In addition, the computer 202 retrieves information as to the user identity and creates a data item referred to as a customer ID 214. After use of the self-help support tool, the customer ID 214 and the trouble resolution data 216 are communicated over the data connection 218, such as a digital subscriber line (DSL) connection, to the network equipment 204. The network equipment 204 retrieves the customer ID 214 and trouble resolution data 216 from the computer 202 as well as other data that may be received at the network equipment and all data provided by the self-help support tool is stored at the self-help support tool data collection module 230. The network equipment 204 communicates the customer ID 214 and the trouble resolution data 216 over a distributive network 206, such as the Internet or a private distributive computer network, to the remotely located call center 220.

The call center 220 stores the customer ID 214 and trouble resolution data 216. A call deflection determination module 224 receives the stored customer ID 214 and trouble resolution data 216 and compares such data with call records stored within the customer call center support data log 222. The call deflection determination module 224, based on the comparison, generates a determination as to the number and identity of potential call center calls that have been deflected through use of the self-help support and diagnostic tool. For example, based on a particular type of trouble item and based on a customer ID, the call deflection determination module checks the call center 220 to determine whether a customer having the caller ID places a call with a specified time frame to the call center. If no call is detected, the resolution actions taken by the SST are tracked as a successful call deflection. The call deflection determination module 224 generates call deflection data and provides such call deflection information to the call deflection measurement and reporting unit 226. The call deflection measurement and reporting module 226 performs cost measurements and other data measurements to create and display call deflection reports for operations personnel to evaluate call deflection metrics and performance.

Figure 3:
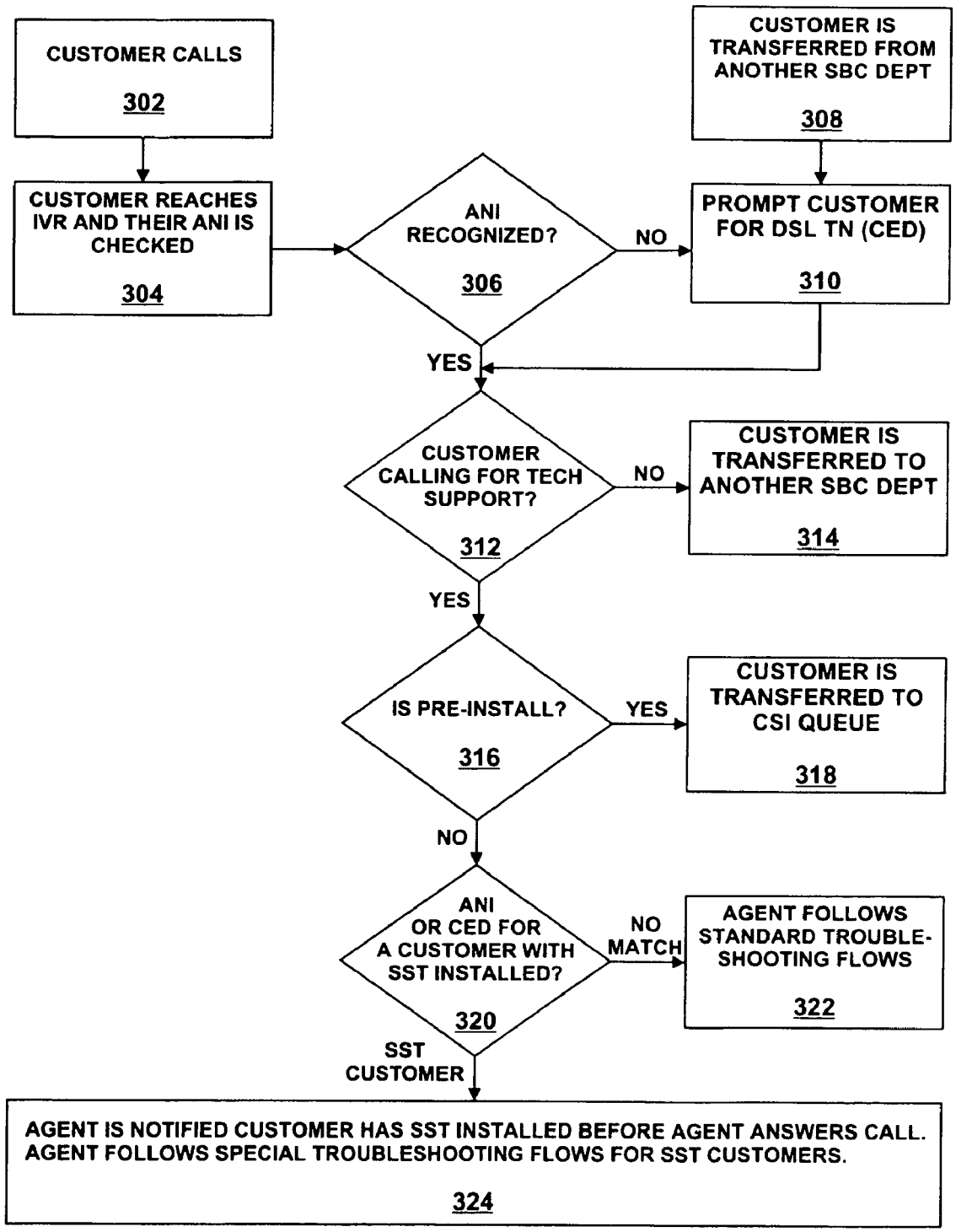

Referring to FIG. 3, a method of operation with respect to the illustrative customer support center and related systems of FIGS. 1 and 2 is shown. A customer call is received, as shown at step 302. For example, a customer may call an 800 number and interact with an interactive voice response (IVR) system. The IVR system may determine a caller identification, such as a telephone number using an automated number identification (ANI) system, as shown at step 304. If the caller identification is not recognized, as shown at step 306, the system may prompt the customer for a caller identification, such as a telephone number associated with a digital subscriber line (DSL) account, as shown at step 310. Similarly, when a call is transferred from another call center system, as shown at step 308, the system may prompt the customer for the caller identification.

Once the customer has entered a caller identification or the system recognizes the caller identification, the customer interacts with an IVR-based menu. For example, the caller may be prompted to determine whether the caller is calling for technical support, as shown at step 312. If the caller is not calling for technical support, the caller is transferred to a call center system or agent not associated with technical support, as shown at step 314.

If the customer is calling for technical support, the caller may be prompted to determine if the self-support tool has been installed, as shown at step 316. If the call has been made prior to installation of the self-support tool, the call may be transferred to a support queue associated with installation assistance and pre-installation troubleshooting, as shown at step 318.

If the self-support tool has been installed, the system may compare the customer identification with a list identifying customers having the self-support tool installed. For example, when the self-support tool is operating, the tool may send a message to notify a self-support tool server of its presence. In addition, the self-support tool may provide data identifying the customer and data identifying trouble issues and resolution actions. The data identifying the customer may be stored in a list and used for comparison with the customer identification received in conjunction with the call.

If the customer identification is not found in the list, the call is transferred to an agent, as shown at step 312. The agent may follow a troubleshooting flow that is based on the determination that the self-support tool is not installed.

If the customer identification is found in the list, a support agent is notified that the self-support tool is installed and operational, as shown at step 324. The call is transferred to the support agent who follows a troubleshooting flow based on the installation and operability of the self-support tool. In one exemplary embodiment, the support agent may also receive information associated with trouble issue and resolution steps identified and taken by the self-support tool.

Figure 4:
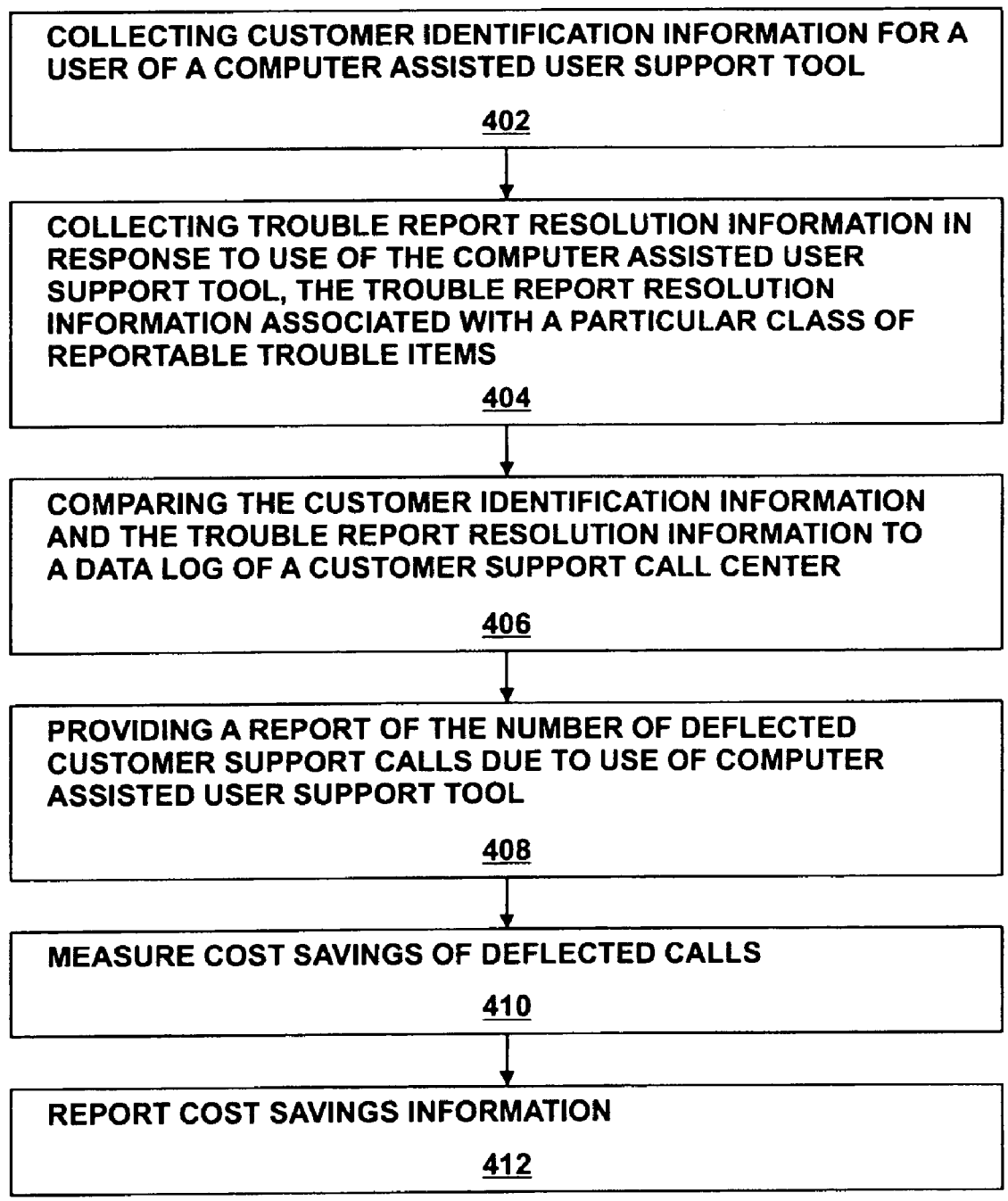

Referring to FIG. 4, a method of operation with respect to the illustrative call centers and related systems of FIGS. 1 and 2 is shown. The method includes collecting customer identification information for a user of a computer-assisted user support tool, as shown at step 402. The method further includes collecting trouble report resolution information in response to use of the computer assisted user support tool, as shown at step 404. The trouble report resolution information may be associated with a particular class of reportable trouble items. As shown at step 406, the customer identification information and the trouble report resolution information are compared to a data log of call records retrieved from a customer support call center. A report of a number of deflected customer support calls through successful use of the computer assisted user support tool is provided, as shown at step 408. Cost savings based on the number of deflected calls is measured as shown at step 410, and a report including the deflected call count and measured call center cost savings information is reported, as shown at step 412. The report may be generated locally or may be distributed over a network for remote access and display.

Referring to FIG. 5, a method of evaluating performance of a computer self-support tool is shown. The method includes collecting data that includes a customer identifier, a reported trouble issue, and resolution action for the reported trouble issue, as shown at 502. The method further includes comparing the data from computer support tool to a call center data log to determine whether the customer called the call center for support with respect to a reported trouble issue corresponding to the issue handled using the self-help tool, or whether the call was successfully deflected by the customer's use of the self-support tool, as shown at step 504. The method further includes recording measurement data with respect to the result of comparing the call center data log and the data from the self-help support tool, as shown at step 506. After the measurement data from the comparison has been recorded, a first cost savings estimate is determined based on the average cost of call center support for the first type of reported trouble issue multiplied by the number of deflected calls having the first type of trouble issue, as shown at step 508. The method further includes determining a second cost savings estimate by multiplying the average cost of call center support for a second type of reported trouble issue with a number of recorded deflected calls having the second type of reported trouble issue, as shown at step 510. An example of the first trouble issue would be an email problem and an example of the second trouble issue class would be a broadband network connectivity failure. The method further includes determining a total cost savings estimate by adding the first cost savings estimate and the second cost savings estimate, as shown at 512. Additional types of reported trouble items and the associated cost savings for calls deflected with those trouble items may also be added to the total cost savings estimate. A report then may be generated to display the total cost savings estimate, as shown at step 514.

Figure 6:
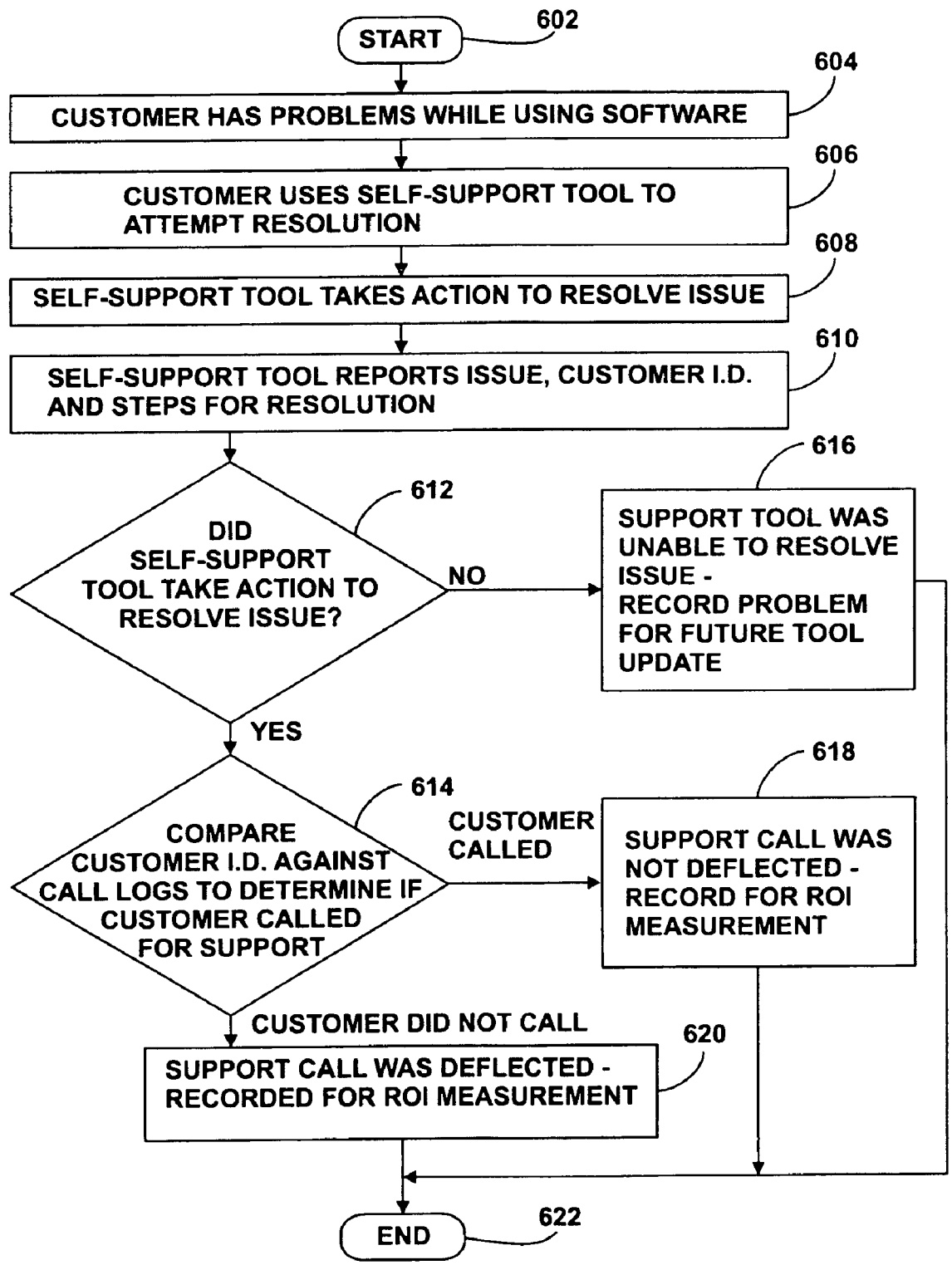

Referring to FIG. 6, a method of identifying and tracking call deflection from use of a computer software self-support tool is shown. The method starts, as shown at step 602, and proceeds to step 604 where a customer has a problem while using a particular software program. The customer uses a computer software self-support tool to attempt resolution of the problem, as shown at step 606, and the computer software self-support tool takes an action to resolve the problem, as shown at step 608. The computer software self-support tool reports the trouble issue, a customer identification, and the steps taken for resolution of the reported problem, as shown at step 610.

At decision step 612, it is determined whether the computer software self-support tool acted to resolve the particular reported trouble issue. If the self-support tool acted to resolve the trouble issue then processing proceeds to decision step 614. Where the self-support tool did not act to support the problem, the method proceeds to step 616, where data is collected to indicate that the support tool was unable to resolve the trouble issue, and the problem is recorded for a future tool update. Processing ends at 622.

Referring back to decision step 614, the customer ID is compared against call log data from a call center to determine if the customer called for agent support. If the customer called for support, the support call was not deflected and the lack of call deflection is recorded for return on investment measurement information, as shown at step 614, and processing ends, as shown at step 622. In the case where the customer did not call for support, then the customer call was successfully deflected and the call deflection is recorded for measurement purposes, as shown at step 620. The method ends, as shown at step 622.

In one exemplary embodiment, software, including self-support tools and other software applications, can report, through a network connection, such as a dial-up connection or a broadband transport connection, information about the software, such as version information, capabilities, and configuration information. This information may be associated with a customer identifier, such as a customer number, a software license code, or an account number. The information and the customer identifier may be accessible to an IVR system. Upon determining the customer identifier associated with a support call, the IVR may use the information to direct the flow of customer support, such as selection of a customer support agent or steps suggested to mitigate a technical problem.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A customer support calls system comprising:
    an interactive voice response system to receive a customer support call, to determine a caller identification associated with the customer support call, and to determine whether the a computer system associated with the customer support call~includes an installed self-support tool;
    a self-support tool server to receive a self-support tool identifier from the computer system associated with the customer support call and to provide the self-support tool identifier to the interactive voice response system;
    wherein the interactive voice response system compares the caller identification associated with the customer support call to the self-support tool identifier provided by the self-support tool server to determine whether the computer system associated with the customer support call includes the installed self-support tool;
    a call center management system responsive to the interactive voice response system, the call center management system configured to direct the customer support call to a destination in response to determining whether the computer system associated with the customer support call includes the installed self-support tool;
    a call center metrics database responsive to the call center management system, the call center metrics database to store metrics data associated with the customer support call;
    a data warehouse responsive to the call center metrics database and responsive to the self-support tool server, the data warehouse to store the metrics data associated with the customer support call and to store the self-support tool identifier from the computer system associated with the customer support call; and an interface system to access the data warehouse and to display measurement data associated with effectiveness of the installed self-support tool.

2. The customer support call system of claim 1, wherein the self-support tool server receives trouble issue data from the installed self-support tool.

3. The customer support call system of claim 1, wherein the self-support tool server receives trouble issue data and resolution data from the installed self-support tool, and wherein the data warehouse stores the trouble issue data and the resolution data.

4. The customer support call system of claim 1, wherein the measurement data includes a measurement of deflected calls.

5. The customer support call system of claim 1, wherein the measurement data includes a return on investment associated with the installed self-support tool.

6. A method of providing computer assisted user support to a user, the method comprising:

receiving, at an interactive voice response system, a customer support call;

determining, at the interactive voice response system, a caller identification associated with the customer support call;

receiving, at a self-support tool server, a self-support tool identifier from a computer system associated with the customer support call comparing, at the interactive voice response system, the caller identification information associated with the customer support call to the self-support tool identifier received at the self-support tool server to determine whether the computer system associated with the customer support call includes an installed self-support tool;

directing the customer support call using a call center management system to a destination when the computer system includes the installed self-support tool;

storing, at a call center metrics database, metrics data associated with the customer support call;

storing, at a data warehouse, the self-support tool identifier from the computer system associated with the customer support call; and sending measurement data accessed from the data warehouse to an interface system for display, wherein the measurement data is associated with effectiveness of the installed self-support tool.

7. The method of claim 6, further comprising notifying a support agent that the computer system associated with the customer support call includes the installed self-support tool.

8. The method of claim 7, further comprising transferring the customer support call to the support agent.

9. The method of claim 8, wherein the support agent follows a troubleshooting flow when the computer system associated with the customer support call includes the installed self-support tool.

10. The method of claim 6, further comprising receiving, at the self-support tool server, notification of a trouble issue from the installed self-support tool.

11. The method of claim 10, further comprising providing information associated with the notification of the trouble issue to a call center agent in conjunction with transferring the customer support call to the call center agent.

12. The method of claim 6, wherein the caller identification is determined using automated number identification.

13. The method of claim 6, further comprising determining whether the customer support call relates to installation activities associated with the installed self-support tool.

14. A tangible computer readable storage memory storing computer executable instructions that, when executed by a computer, cause the computer to:

receive a customer support call;

determine a caller identification associated with the customer support call;

receive a self-support tool identifier from a computer system associated with the customer support call;

compare the caller identification information associated with the customer support call to the self-support tool identifier to determine whether the computer system associated with the customer support call includes an installed self-support tool;

direct the customer support call to a destination when the computer system includes the installed self-support tool;

store metrics data associated with the customer support call at a call center metrics database;

store the self-support tool identifier from the computer system associated with the customer support call at a data warehouse in response to the call center metrics database and the self-support tool server; and send measurement data associated with effectiveness of the installed self-support tool to an interface system for display.

15. The computer readable storage medium of claim 14, wherein the measurement data includes a measurement of deflected calls.

16. The computer readable storage medium of claim 14, wherein the measurement data includes return on investment information associated with the installed self-support tool.

17. The computer readable storage medium of claim 14, wherein the caller identification is determined using automated number identification.

* * * * *